Nov. 22, 1938.   D. A. GILLEN   2,137,685
DOUBLE MANUAL AND AUTOMATIC SHUT-OFF VALVE
Filed Dec. 30, 1937
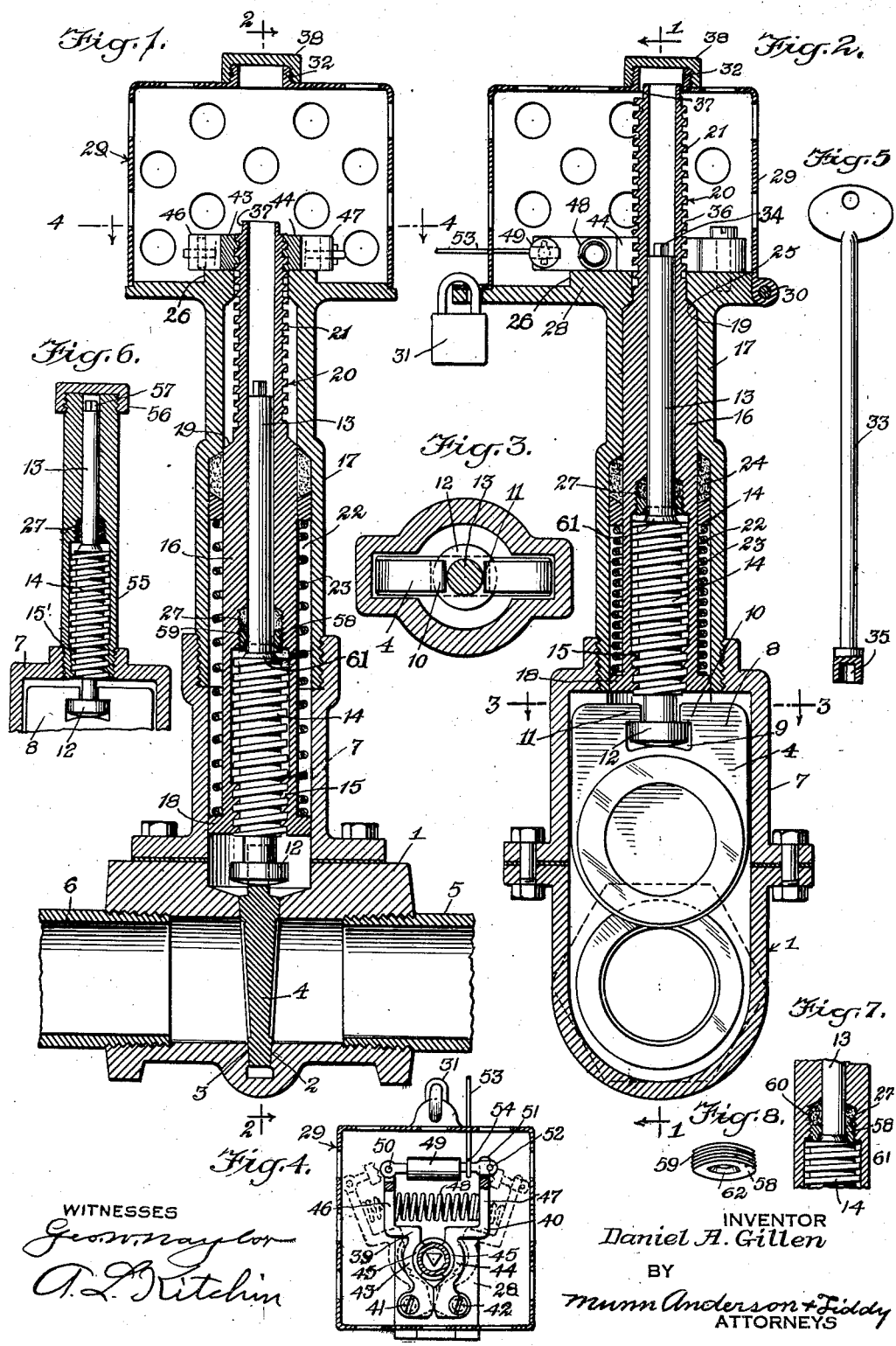
INVENTOR
Daniel A. Gillen Patented Nov. 22, 1938

2,137,685

UNITED STATES PATENT OFFICE 2,137,685

DOUBLE MANUAL AND AUTOMATIC SHUT-OFF VALVE

Daniel A. Gillen, Flushing, N. Y.

Application December 30, 1937, Serial No. 182,507

2 Claims. (Cl. 137—162)

This invention relates to shut-off valves and particularly to an improved shut-off gas valve which may be manually shut off by two different structures or automatically shut off through the action of a fusible member, an object being to present a construction which is comparatively simple but which will efficiently operate under all conditions.

Another object of the invention is to provide a shut-off valve utilizing a gate type of valve structure in connection with manual and automatic control members.

A further object more specifically is to provide a shut-off valve of the gate type which may be readily opened or closed and which is provided with a protected fusible holding structure designed to hold the valve normaly open until the temperature adjacent the fusible member has reached a certain point.

An additional object of the invention is to provide a shut-off valve which may or may not be provided with an automatic shut-off structure and which in each instance is provided with a manual shut-off structure formed in such a way as to require special tools to open and close the same.

In the accompanying drawing—

Fig. 1 is a longitudinal vertical sectional view through a shut-off valve embodying the invention on line 1—1 of Fig. 2, the same being shown in a closed position;

Fig. 2 is a sectional view through Fig. 1 approximately on the line 2—2, the same, however, being shown in an open position;

Fig. 3 is a fragmentary sectional view through Fig. 2 on the line 3—3;

Fig. 4 is a sectional view through Fig. 1 on the line 4—4;

Fig. 5 is a side elevation of the instrument used for manually opening and closing the valve shown in Fig. 2;

Fig. 6 is a vertical sectional view showing a slightly modified form of structure to that illustrated in Fig. 2, in respect to the manual means for opening and closing the valve;

Fig. 7 is a fragmentary sectional view showing one of the packing glands illustrated in Fig. 2;

Fig. 8 is an enlarged perspective view of the packing ring shown in Fig. 7.

Referring to the accompanying drawing by numerals, 1 indicates a valve casing provided with valve seats 2 and 3 coacting with a gate valve member 4 and forming with the casing a complete valve structure. Pipes 5 and 6 are threaded into casing 1 so that fluid may pass from one pipe to the other when the gate valve member 4 is opened as shown in Fig. 2.

The valve illustrated in the drawings may be used in connection with any desired fluid, as for instance liquid or gas, but is preferably designed for use in connection with ordinary house gas. Also the valve while it may be used in shops and many other places is designed primarily to be used near the gas meter in an ordinary home. The parts are so arranged that in case there should be a fire and the heat becomes more or less intense near the device, automatically actuated means would function to cause the valve to quickly close and thereby shut off the supply of gas. In addition means are provided for causing the automatic actuating means to be automatically shifted to a non-functioning position whereby the valve quickly and automatically shifts. As a second manual way of closing the valve, a wrench, key, or other tool 33 may be used for closing and opening the valve independently of the automatic means. It will therefore be seen that there are provided two manual ways of closing the valve and one purely automatic way.

As illustrated particularly in Figs. 1 and 2, there is provided a housing 7 which is bolted or otherwise rigidly secured to the casing 1, providing means for receiving the gate valve member 4 when the same is opened. It will be observed that the gate valve 4 is provided with an upwardly extending flange or extension 8 having a notch 9 so formed as to present overhanging shoulders 10 and 11 beneath which the head 12 is located. This head is the lower end of the rod or stem 13, which rod or stem is provided with an enlarged threaded section 14 coacting with the threads 15 of a sliding tool or member 16. This slidable tool or member is slidingly mounted in an exterior tubular member or auxiliary casing 17 screwed into the upper part of the housing 7. The exterior surface of the slidable tubular member 16 is provided with a rotatable flange 18 at the bottom, an inclined ground seat 19, and a reduced upper extension 20 having threads 21. The auxiliary casing or housing 17 is provided with a chamber 22 which is adapted to receive the spring 23 acting on one end of the flange 18 and on the other end of the packing structure 24. The packing structure 24 acts to prevent any leakage of gas while the ground seat 19 coacts with the ground seat 25 and also prevents leakage of gas. The ground valve seat 25 is formed on an inwardly extending portion 26 of the auxiliary housing or casing 17. Surrounding the small part of the rod 13 is a packing gland 27 which acts to prevent leakage at this point.

At the upper end of the auxiliary housing or casing 17 is provided a platform 28 which may be integral with the inwardly extending portion 26 and which also may be integral with the housing 17 or formed separate and rigidly secured thereto by threads, welding, or the like. A foraminous sheet metal protecting housing 29 is hingedly connected at 30 to the platform 28 so as to protect certain parts hereinafter fully described. A padlock or the like 31 acts to lock the foraminous housing 29 closed. A hollow or tubular boss 32 extends upwardly from the housing 29 with the bore of the boss of the same size and in line with the small part of the rod 13, whereby an instrument, as for instance the key 33 shown in Fig. 5, may be inserted and the rod 13 rotated independently of the tubular member 16 or adjacent parts.

The upper end of the rod 13 is provided with a tool-receiving extension 34 which may be square, triangular, or other shape. Preferably the extension 34 is triangular in shape as are also the socket 35 and key 33. The rod 13 rotates and also slides in the tubular member 16 so that whenever the tool or key 33 is used the rod may be rotated and moved longitudinally upwardly or downwardly for opening or closing the valve. The extension 20 of the tubular member 16 is provided with a threaded section 36 for almost its full length so that at the upper end there is provided a squared exterior portion 37 whereby a wrench may be applied for rotating the tubular member 16. Only an authorized person can do this as the lock 31 must be unlocked and removed so that the housing 29 may be swung out of the way. To use the key 33 this is not necessary as merely the protecting cap 38 need be unscrewed and the key can then function properly.

A pair of gripping members 39 and 40 are arranged within the housing 29, as shown particularly in Fig. 4. These gripping members are pivotally connected with the platform 28 by suitable screws 41 and 42, whereby the clamping members may be swung horizontally when the rod 13 is extended vertically. These clamping members are provided with gripping jaws 43 and 44, each jaw having an extension or a plurality of extensions or teeth 45 adapted to fit into the threads 36 of the extension 20. Outwardly extending arms 46 and 47 are provided and a spring 48 is arranged therebetween so as to give the arms a tendency to move apart, namely, to the dotted position in Fig. 4, whenever desired. When moved to the dotted position shown in Fig. 4, the teeth of the members 45 will move away from the threads 36 and thereby release the tubular member 16, whereupon spring 23 will immediately function to quickly move the rod 13 and the valve member 4 downwardly until the valve member occupies its functioning or closed position as shown in Fig. 1.

A fusible member 49, preferably of metal, is provided and at 50 it is pivotally connected to arm 46, while at 51 it merely overlaps the arm or member 47 so that a pin 52 will engage and hold the arm 47 against swinging movement. In case the temperature of the fusible member 49 becomes too great it will fuse or melt and then spring 48 will quickly cause the jaws to separate and release the tubular member 16 whereupon the valve member 4 will move to its closed position.

There will be times when it is desired to quickly close the valve when there is no heat in the immediate vicinity thereof. In order to take care of this contingency, a pull rod or cable 53 is connected at 54 to the fusible member 49 and extends any desired distance to a suitable point where it may be grasped and held at any time. When the pull member 53 has been pulled, pin 52 will move off arm 47 and this action will permit spring 48 to spread the arms and release the jaws 43 and 44 the same as if the member 49 had fused.

It will therefore be seen that the fusible member may be caused to function either by heat or by manual actuation. It will also be seen that the valve member 4 may be opened and closed by the key 33 acting on rod 13. In this way two manually actuated means have been provided for causing a closing of the valve, and by the use of a fusible member 49 an automatic structure has been presented. The fusible member 49 and the pull rod 53 depend upon the spring 23 and associated parts to cause a complete closing of the valve member 4.

After the fusible member 49 has been fused and the parts moved to their closed position as shown in Fig. 1, the valve remains closed until manually opened. If it should be desired to reset the valve with a new fuse, the housing 29 is swung to the open position and the jaws and associated parts are moved by hand to the position shown in Fig. 4. The fusible member 49 is then applied. After this has been done, a wrench or other tool is applied to the square part 37 and the tubular member 16 is rotated in proper direction for moving the same upwardly against the action of spring 23. This movement is continued until the parts assume the position as shown in Fig. 2. The housing 19 is then closed and locked and the device is in functioning condition again.

In Fig. 6 a slightly modified form of the invention is shown wherein the sliding tubular member 16 and associated parts are eliminated. In this form of the invention the tube 55 is threaded into the housing 7 and has a cap 56 to close the upper end. The rod 13 is constructed similar to that shown in Fig. 2 and coacts with threads 15' so that the wrench, key, or other tool is connected to the tool-receiving portion 56 and the rod rotated, and the gate valve 4 will be raised and lowered as desired. This is purely a mechanical way of opening and closing the valve but presents a construction which requires a special tool to open the valve because the portion 57 will be an appreciable distance below the cap 56 when the valve is closed. The portion 57 is preferably triangular in shape so as to receive the same shaped socket wrench though another shape could be used without departing from the spirit of the invention.

In the various forms of the invention there is provided a packing gland 27 surrounding the rod 13. A packing ring 58 forming part of the packing gland is preferably provided with threads 59 on the exterior surface which mesh with threads 60 on member 16. The rod 13 is provided with a cone-shaped member 61 at the point which adjoins the threaded part 14, whereby whenever it is desired to compress the packing material into a more condensed mass rod 13 is unscrewed until the cone-shaped member 61 engages the opening 62 in ring 58, whereupon this ring will be caused to rotate by friction and compress the packing material. This movement is, of course, very small but may be performed at any time.

I claim:

1. A shut-off valve including a valve casing, a slidable valve member for closing said casing, a lifting rod rotatably connected to said slidable valve member for opening and closing the same, a slidable tubular member connected to said rod by threads, whereby said rod may be rotated independently of said tubular member for opening and closing said slidable valve member manually, a spring acting on said tubular member for moving the same to cause said rod to close said slidable valve, means for holding said tubular member against movement by said spring, an auxiliary spring for giving said means a tendency to move to a non-functioning position and a fusible metal member for normally holding said means in functioning position.

2. A shut-off valve of the character described including a valve structure having a slidable valve, a rod having one end rotatably connected to said slidable valve for opening and closing the same, said rod having a threaded section, a tubular slidable member having threads coacting with the threads on said rod, whereby upon rotation of said rod independently of said tubular slidable member, said slidable valve may be opened or closed according to the direction of rotation of the rod, a tubular casing surrounding said tubular slidable member, said casing having one end connected to said valve structure, a spring acting on said casing and said slidable tubular member for moving the slidable tubular member and said rod in a direction for closing said slidable valve, said slidable tubular member having grooves at one end, a pair of gripping members carried by said casing at its upper end, said gripping members being provided with projections adapted to fit into said grooves for preventing said slidable tubular member functioning, a fusible member connecting said gripping members for holding the gripping members in functioning position, and a spring for quickly separating said gripping members for releasing said slidable tubular member when said fusible member has fused or been moved to a non-functioning position.

DANIEL A. GILLEN.